United States Patent [19]

Nakano et al.

[11] Patent Number: 5,612,426

[45] Date of Patent: Mar. 18, 1997

[54] PROCESS OF PRODUCING VINYL CHLORIDE POLYMER USING AN ORGANIC PEROXIDE IN COMBINATION WITH 3-HYDROXY-1,1-DIMETHYLBUTYL PEROXYNEODECANOATE

[75] Inventors: Toshihiko Nakano; Tadashi Amano, both of Kamisu-machi, Japan

[73] Assignee: Shin-Etsu Chemical Co., Ltd., Tokyo, Japan

[21] Appl. No.: 432,811

[22] Filed: May 2, 1995

[30] Foreign Application Priority Data

| | | | |
|---|---|---|---|
| May 2, 1994 | [JP] | Japan | 6-115996 |
| Oct. 13, 1994 | [JP] | Japan | 6-274569 |
| Oct. 13, 1994 | [JP] | Japan | 6-274570 |

[51] Int. Cl.$^6$ .................................................. C08F 2/20
[52] U.S. Cl. ............................................. 526/62; 526/228
[58] Field of Search ................................................ 526/62

[56] References Cited

U.S. PATENT DOCUMENTS 5,442,002   8/1995   Shimizu ...................... 524/81

*Primary Examiner*—Christopher Henderson
*Attorney, Agent, or Firm*—Oblon, Spivak, McClelland, Maier & Neustadt, P.C.

[57] ABSTRACT

This process is a process of producing a vinyl chloride polymer by suspension polymerization of vinyl chloride or a mixture of vinyl monomers mainly made up of vinyl chloride in an aqueous medium in the presence of an oil-soluble polymerization initiator, wherein, as said oil-soluble polymerization initiator, (A) an organic peroxide such that a 10-hour half-life period temperature of a solution containing 0.1 mol of the organic peroxide per liter of benzene is 30° to 50° C. and the organic peroxide does not, in its structure, contain a benzene ring or an alkoxy group, and (B) 3-hydroxy-1,1-dimethylbutyl peroxyneodecanoate are used in combination. The polymerization vessel used is preferably coated with a polymer scale preventive agent. According to the invention, in case where the amount of the polymerization initiator used is increased while using an existing polymerization apparatus, the deposition of polymer scale in the polymerization vessel is suppressed, the insufficient cooling capacity of the existing polymerization apparatus can be made up, and the polymerization time can be shortened to improve the productivity.

11 Claims, No Drawings

PROCESS OF PRODUCING VINYL CHLORIDE POLYMER USING AN ORGANIC PEROXIDE IN COMBINATION WITH 3-HYDROXY-1,1-DIMETHYLBUTYL PEROXYNEODECANOATE

BACKGROUND OF THE INVENTION

1. Field of the Invention

The present invention relates to a process of producing a vinyl chloride polymer, and more particularly to a process of producing a vinyl chloride polymer which is suitable for producing a vinyl chloride polymer in high quality and high productivity while preventing deposition of polymer scale.

2. Description of the Prior Art

A vinyl chloride polymer is generally produced by suspension polymerization of vinyl chloride monomer or a mixture of vinyl type monomers mainly made up of vinyl chloride monomer in an aqueous medium in the presence of an oil-soluble polymerization initiator. Generally, where a polymer having an average degree of polymerization of 1,700 or more is produced, this suspension polymerization is carried out under such polymerization conditions that the polymerization temperature is 30° to 45° C. and the polymerization time is about 8 hours, whereas where a polymer having an average degree of polymerization of about 700 to 1,000, the suspension polymerization is carried out under such polymerization conditions that the polymerization temperature is 55° to 63° C. and the polymerization time is about 4 hours. At that time, the oil-soluble polymerization initiator is normally used in an amount of about 0.04 to 0.20% by weight based on the monomer, although the amount varies depending on the type of the oil-soluble polymerization initiator to be used. Depending on the type of the polymerization initiator used at that time, the polymerization initiator affects greatly the pattern of heat generation, the polymerization time, the productivity, and the deposition of polymer scale during polymerization as well as the initial coloration of the polymer and the quality and characteristics of the polymer, such as the heat stability, the odor, and the anti-leaching.

In recent years, it is attempted to shorten the polymerization time in order to improve the productivity of vinyl chloride polymers. As one technique of shortening the polymerization time, it is thought to increase the amount of the polymerization initiator to be added. However, where the amount of the polymerization initiator is increased, the following problems arise:

(a) Polymer scale is deposited within a polymerization vessel.

(b) Since the amount of the heat generation of the reaction per unit time at the time when the amount of the heat generation of the reaction per unit time reaches the peak during the polymerization is increased considerably, the cooling capacity of the existing polymerization apparatus becomes insufficient at the time of this peak. Accordingly, the increase in the amount of the polymerization initiator is limited and therefore the shortening of the polymerization time is also restricted.

(c) Either the quality of formed products of the resulting vinyl chloride polymer is lowered: for example, the fish eyes are increased, the initial coloration is degraded, and the heat stability is lowered, or an increase in the residue and decomposed products of the polymerization initiator causes such problems as generation of a nasty odor, an increase in leaches, and an increase in deposition of polymer scale in the polymerization vessel.

To cope with these problems, a technique is suggested wherein two types of oil-soluble polymerization initiators are used in combination. Specifically, as this technique, it is suggested to use BPD (t-butyl peroxyneodecanoate) and CPD (α-cumyl peroxyneodecanoate) in combination. According to this technique, although it is possible to make up the insufficient cooling capacity and to shorten the polymerization time, there are such defects as generation of polymer scale deposition within the polymerization vessel at the end of polymerization an increase in fish eyes of the obtained vinyl chloride polymer, generation of a nasty odor due to an increase in the residue and decomposed products of the polymerization initiators, an increase in leaches, and a deterioration in the quality of the polymer.

As a technique capable of obviating the defects of the above technique, it is proposed to use BPD (t-butyl peroxyneodecanoate) and HDPH (3-hydroxy-1,1-dimethylbutyl peroxyneoheptanoate) in combination (Japanese Pre-examination Patent Publication (KOKAI) No. 5-155910), but this technique is not satisfactory in fish eyes of the resulting vinyl chloride polymer.

SUMMARY OF THE INVENTION

An object of the present invention is to provide a process of producing a vinyl chloride polymer by suspension polymerization of vinyl chloride or a mixture of vinyl type monomers made up mainly of vinyl chloride in an aqueous medium in the presence of a polymerization initiator, which process can produce a high-quality vinyl chloride polymer with less fish eyes, good in initial coloration, and with less leaches, even if the amount of the polymerization initiator used is increased while using an existing polymerization apparatus, can suppress deposition of polymer scale, can make up the insufficient cooling capacity of the existing polymerization apparatus, and can shorten the polymerization time.

To attain the above object, the present invention provides a process of producing a vinyl chloride polymer, which comprises suspension polymerizing vinyl chloride or a mixture of vinyl monomers containing vinyl chloride in an aqueous medium in the presence of an oil-soluble polymerization initiator in a polymerization vessel, wherein said oil-soluble polymerization initiator comprises:

(A) an organic peroxide such that a 10-hour half-life period temperature of a solution containing 0.1 mol of the organic peroxide per liter of benzene is 30° to 50° C. and the organic peroxide does not, in its structure, contain a benzene ring or an alkoxy group, and (B) 3-hydroxy-1,1-dimethylbutyl peroxyneodecanoate, in combination.

The polymerization vessel used in the present invention is preferably a polymerization vessel having a polymer scale deposition preventive coating on the inner wall surface.

According to the process of the present invention, in polymerizing vinyl chloride or a mixture of vinyl monomers mainly made up of vinyl chloride, even if the amount of the polymerization initiator used is increased while using an existing polymerization apparatus, polymer scale deposition can be suppressed, the insufficient cooling capacity of the existing polymerization apparatus can be made up and the polymerization time can be shortened to improve the productivity.

Further, the quality of the polymer obtained by this production process is good, formed products having less fish eyes can be provided, the initial coloration is good, and the amount of leaches is less.

In particular, where a polymerization vessel having a suitable polymer scale deposition preventive coating on the inner wall surface is used, deposition of polymer scale in the polymerization vessel can be substantially completely suppressed even after repeating the polymerization procedure, for example, 100 times.

DETAILED DESCRIPTION OF PREFERRED EMBODIMENTS

The present invention will be described in detail below.
Polymerization initiators The process of the present invention has a major feature in the constitution of the polymerization initiators to be used, which controls the heat generated along with the rise and the progress of the polymerization.

The component (A), an oil-soluble polymerization initiator, used in the process of the present invention is an organic peroxide such that a 10-hour half-life period temperature of a solution containing 0.1 mol of the organic peroxide per liter of benzene is 30° to 50° C. and the organic peroxide does not, in its structure, contain a benzene ring or an alkoxy group. If the component (A) is such an organic peroxide that said 10-hour half-life period temperature is lower than 30° C., it is hard for the activity of the polymerization initiator to be kept. If such an organic peroxide that said 10-hour half-life period temperature is over 50° C. is used, since an excessively large amount of the polymerization initiator is required, the quality of the resulting polymer, such as initial coloration and anti-leaching, is lowered. Further, if the polymerization initiator has a benzene ring in the molecule, since UV absorption peaks are detected when the leaching test of the obtained polymer is carried out, there is a fear that the application of the polymer to the field of medicine, food, and the like is restricted. Further, if the polymerization initiator has an alkoxy group in the molecule, deposition of polymer scale is liable to occur in the polymerization vessel.

As the organic peroxide that is such an organic peroxide that the 10-hour half-life period temperature of the solution containing 0.1 mol of the organic peroxide per liter of benzene is 30° to 50° C. and the structure of the organic peroxide does not contain a benzene ring or an alkoxy group, preferably, for example, the below-mentioned diacyl peroxide compounds and perester compounds are used.

The diacyl peroxide compound includes, for example, a diacyl peroxide represented by the following general formula (1):

$$R^1-\overset{O}{\underset{\|}{C}}-O-O-\overset{O}{\underset{\|}{C}}-R^1 \qquad (1)$$

wherein $R^1$, which are the same or different, represent a substituted or unsubstituted alkyl group having 1 to 15, and preferably 1 to 6, carbon atoms. In the general formula (1), the substituted or unsubstituted alkyl group $R^1$ having 1 to 15 carbon atoms includes, for example, an n-alkyl group, such as a methyl group, an ethyl group, an n-propyl group, an n-butyl group, an n-pentyl group, and an n-hexyl group; a sec-alkyl group, such as an isopropyl group, an isobutyl group, and an isopentyl group; a tert-alkyl group, such as a tert-butyl group, and a tert-pentyl group; a cyclic alkyl group, such as a cyclopropyl group, a cyclobutyl group, a cyclopentyl group, and a cyclohexyl group. The diacyl peroxide represented by the general formula (1) includes, for example, isobutyryl peroxide (33° C) (herein the temperature in the parentheses after the name of the polymerization initiator is the 10-hour half-life period temperature of the solution containing 0.1 mol of the particular polymerization initiator per liter of benzene, the same being applied hereinafter).

The perester compound includes, for example, a perester represented by the following general formula (2):

wherein $R^2$, which are the same or different, represent a substituted or unsubstituted alkyl group having 1 to 20, and preferably 1 to 10, carbon atoms. In the general formula (2), the substituted or unsubstituted alkyl group $R^2$ having 1 to 20 carbon atoms includes, for example, an n-alkyl group, such as a methyl group, an ethyl group, an n-propyl group, an n-butyl group, an n-pentyl group, an n-hexyl group, an n-heptyl group, an n-octyl group, an n-nonyl group, and an n-decyl group; a sec-alkyl group, such as an isopropyl group, an isobutyl group, an isopentyl group, an isoheptyl group, and an iso-octyl group; a tert-alkyl group, such as a tert-butyl group, a tert-pentyl group, a tert-hexyl group, a tert-nonyl group, and a tert-decyl group; a cyclic alkyl group, such as a 1-cyclohexyl-1-methylethyl group; and a 2,4,4-trimethylpentyl group. The perester represented by the general formula (2) includes, for example, t-hexyl peroxyneodecanoate (45° C.), t-butyl peroxyneodecanoate (46° C.), t-hexyl peroxyneohexanoate (49° C), 2,4,4-trimethylpentyl peroxy-2-neodecanoate (36° C.), and 1-cyclohexyl-1-methylethyl peroxyneodecanoate.

Out of the above-mentioned organic peroxides (A), particularly isobutyryl peroxide, t-hexyl peroxyneodecanoate, t-butyl peroxyneodecanoate, t-hexyl peroxyneohexanoate, 2,4,4-trimethylpentyl peroxy-2-neodecanoate, and 1-cyclohexyl-1-methylethyl peroxyneodecanoate are preferably used.

The above-mentioned organic peroxides (A) may be used singly or in combination of two or more.

The 10-hour half-life period temperature of the organic peroxide (A) is determined as follows:

A solution containing 0.1 mol of the organic peroxide in 1 liter of benzene is prepared. The solution is hermetically placed in a glass tube whose inside has been replaced by nitrogen and the glass tube is immersed in a constant temperature bath wherein the inside is adjusted to a prescribed temperature, so that the organic peroxide is decomposed. The change in concentration of the organic peroxide with the time is measured.

Under the above reaction conditions, since the decomposition reaction of the organic peroxide can be treated approximately as a first-order reaction, the following equations can be formed:

$$dx/dt = k(a-x) \qquad (3)$$

$$\ln[a/(a-x)] = kt \qquad (4)$$

wherein x denotes the concentration of the decomposed organic peroxide, a denotes the initial concentration of the organic peroxide, k denotes the decomposition rate constant, and t denotes the time.

Since the half-life period is the time required for the concentration of the organic peroxide being reduced to the half by the decomposition, by representing the half-life period by $t_{1/2}$ and then substituting $a/2$ for x in the equation (4), the following relationship is obtained:

$$kt_{1/2} = \ln 2 \qquad (5)$$

The relationship between the time t and ln [a/(a−x)] is plotted from the change of the concentration of the organic peroxide measured above. By letting the gradient of the obtained straight line be k, from the equation (5) the half-life period $t_{1/2}$ at that temperature can be found. Therefore, the 10-hour half-life period temperature is determined as the temperature at which $t_{1/2}$ of the organic peroxide becomes 10 hours.

On the other hand, as the oil-soluble polymerization initiator that acts as the component (B), 3-hydroxy-1,1dimethylbutyl peroxyneodecanoate, [$CH_3$—CH(OH)—$CH_2$—$C(CH_3)_2$—O—O—CO—t—$C_9H_{19}$], is used.

The blending ratio of the component (A) to the component (B) is preferably from 1:9 to 9:1, and more preferably from 1:6 to 5:1, by weight. If the value of the blending ratio is too small, it becomes difficult to suppress the deposition of polymer scale in a polymerization vessel, while if the value of the blending ratio is too large, there is a fear that the initial coloration of the polymer is deteriorated or that the heat stability of the polymer is lowered.

The total amount of the components (A) and (B) to be used may be an amount enough to attain the purpose of shortening the polymerization time. This amount is generally 0.05 to 0.4% by weight, and preferably 0.08 to 0.3% by weight, based on the monomer.

For example, when vinyl chloride is polymerized at a polymerization temperature of 35° to 45° C. to produce a vinyl chloride polymer having an average degree of polymerization of 1,700 or more, the above polymerization initiator is preferably used in an amount of 0.1 to 0.4% by weight based on the monomer and when vinyl chloride is polymerized at a polymerization temperature of 55° to 63° C. to produce a vinyl chloride polymer having an average degree of polymerization of 700 to 1,000, the above polymerization initiator is preferably used in an amount of 0.05 to 0.35% by weight based on the monomer.

The method of charging the polymerization initiator into a polymerization vessel is not particularly restricted and any conventionally known method can be employed, for example, the polymerization initiator in solution diluted with a solvent may be charged or may be dispersed in water and charged as an emulsion or suspension. Further, the polymerization initiator may be charged together with water and/or a suspension agent or after the charging of water and/or a suspension agent, or the polymerization initiator may be pumped into the polymerization vessel after the charging of the monomer. The polymerization initiators may be charged as a mixture of two or more, or the polymerization initiators may be separately charged singly or as a mixture of two or more.

Other polymerization conditions used in the present process may generally be similar to the conditions conventionally used in suspension polymerization of vinyl chloride or a vinyl type monomer mixture mainly made up of vinyl chloride in an aqueous medium, but preferably the polymerization vessel used in the polymerization reaction is a polymerization vessel having a polymer scale deposition preventive coating on its inner wall surface. Now such a polymer scale deposition preventive coating is described below.

Polymer scale deposition preventive coatings

To prevent polymer scale from being deposited in a polymerization vessel, conventionally it is carried out to apply, to the inner wall surface of the polymerization vessel, a dye, a pigment, a water-soluble polymer compound, a nitrite, a nitrogen-containing aromatic compound, a heterocyclic compound, an iodine compound, a pyrogallol derivative, a phenolic compound, an aromatic amine compound, or the like, as a polymer scale deposition preventive agent.

Although, in the process of the present invention, of course, a polymerization vessel having these conventional polymer scale deposition preventive agents can be used, at the time of the production of a vinyl chloride polymer, the conventional polymer scale deposition preventive agents cannot satisfactorily suppress deposition of polymer scale in the polymerization vessel, and particularly at the gaseous phase part and the gaseous phase/liquid phase interface part and thereabout. Therefore, the present inventors have studied in various ways and have found that, by using one of the below-mentioned polymer scale deposition preventive coatings, deposition of polymer scale at the gaseous phase part and the interface part and thereabout, which parts have been conventionally difficult to suppress deposition of polymer scale, can be securely suppressed, the frequency of the required work of removing polymer scale in the polymerization vessel is drastically reduced, and the polymerization vessel can be used continuously for a long period of time.

The above polymer scale deposition preventive coating is a coating formed by applying, onto said inner wall surface, an alkaline liquid containing at least one member selected from the group consisting of (a) condensation products of a diphenyl compound having at least two amino groups represented by the following general formula (6):

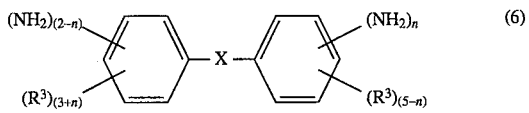

wherein $R^3$, which are the same or different, represent a group selected from the group consisting of —H, —OH, —COOH, —$S_3H$, —$NH_2$, —C, —$NO_2$, —COCH3, —$N(CH_3)_2$, and an alkyl group having 1 to 3 carbon atoms, X represents a bivalent group selected from the group consisting of an alkylene group having 1 to 5 carbon atoms, —$N(CH_3)$—, —$C(CH_3)_2$—, —CONH—, —P(=O)H—, —$SO_2$—, —O—, —S—, and —$Si(R)_2$—in which R represents an alkyl group having 1 to 10 carbon atoms, and n is an integer of from 1 to 2, with a quinone compound, and (b) self-condensation products having a molecular weight of 400 to 50,000 obtained by condensing a quinone compound; and (c) at least one member selected from the group consisting of water-soluble polymer compounds, inorganic colloids, and alkali metal silicates; followed by drying the alkaline liquid.

[(a) Condensation products]

Specific examples of the diphenyl compound represented by the above general formula (6) (hereinafter referred to as the diphenyl compound) include 4,4'-diaminodiphenyl sulfide, 4,4'-diaminodiphenyl ether, 4,4'-diaminodiphenylpropane, 4,4'-diaminodiphenyl sulfone, bis(4-aminophenyl)diethylsilane, bis(4-aminophenyl)phosphine oxide, bis(4-aminophenyl)-N-methylamine, 4,4'-diaminobenzanilide, and 4,4'diaminodiphenylmethane.

Out of them, 4,4'-diaminodiphenyl sulfone, 4,4'diaminobenzanilide, 4,4'-diaminodiphenyl ether, and 4,4'diaminodiphenylmethane are preferable.

The above diphenyl compounds may be used singly or in combination of two or more.

The quinone compound includes, for example, benzoquinone compounds represented by the following general formulas (7) and (8):

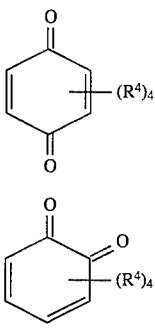

wherein $R^4$, which are the same or different, represent a group selected from the group consisting of —H, —$NH_2$, —Cl, —Br, —OH, —$NO_2$, —$COCH_3$, —$OCH_3$, —$N(CH_3)_2$, —COOH, —$SO_3H$, and an alkyl group having 1 to 3 carbon atoms, and naphthoquinone compounds represented by the following general formulas (9) and (10):

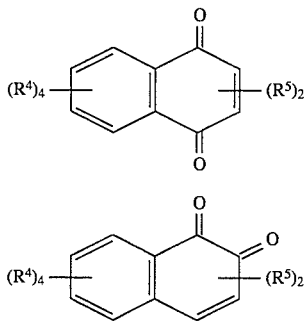

wherein $R^4$ have the same meaning as defined above, and $R^5$, which are the same or different, represent a group selected from the group consisting of —H, —Cl, —Br, —OH, —$COCH_3$, —$OCH_3$, —$CH_3$, —COOH, and —$SO_3H$.

Specific examples of the above benzoquinone compound include o-, m-, and p-benzoquinones, hydroxy-p-benzoquinone, chloro-p-benzoquinone, bromo-p-benzoquinone, duroquinone, and chloranil.

Specific examples of the above naphthoquinone compound include 6-methyl-1,4-naphthoquinone, 2-methyl-1,4-naphthoquinone, lawsone, juglone, plumbagin, α-naphthoquinone, and β-naphthoquinone.

Out of these quinone compounds, o- and p-benzoquinones, α-naphthoquinone, β-naphthoquinone, and lawsone are preferable.

The above quinone compounds may be used singly or in combination of two or more.

The above condensation product (a) is produced, for example, by reacting the above diphenyl compound and quinone compound in a suitable solvent, generally at room temperature to 200° C. for 0.5 to 100 hours, and preferably at room temperature to 150° C. for 3 to 30 hours, if necessary, in the presence of a catalyst.

Since the above quinone compound also acts as a catalyst, generally it is not required to add other condensation catalyst, but other condensation catalyst, such as the below-given oxidizing agents, can be added.

Other condensation catalyst includes, for example, an elemental or molecular halogen, such as iodine, bromine, chlorine, and fluorine; an oxyacid or oxyacid salt of a halogen, such as iodic acid, periodic acid, potassium periodate, and sodium periodate; an inorganic peroxide, such as hydrogen peroxide, sodium peroxide, potassium persulfate, and ammonium persulfate; an organic peroxide, such as peracetic acid, benzoyl peroxide, cumene hydroperoxide, perbenzoic acid, and p-methane hydroperoxide; a chloride and a sulfate of a metal selected from the group of iron and copper, such as ferrous chloride, ferric chloride, copper sulfate, and cuprous chloride; an azo compound, such as α,α'-azobisisobutyronitrile and α,α'-azobis-2,4-dimethylvaleronitrile; and an aromatic nitro compound, such as nitrobenzene, o-, m-, or p-oxynitrobenzene, o-, m-, or p-nitroanisol, o-, m-, or p-nitrobenzoic acid, and o-, m-, or p-nitrobenzenesulfonic acid.

As the solvent for the above condensation reaction, for example, an organic solvent, such as alcohols, ketones, and esters, is used, and out of them, it is preferable to use an organic solvent miscible with water. Examples of the organic solvent miscible with water include alcohols, such as methanol, ethanol, and propanol; ketones, such as acetone, and methyl ethyl ketone; esters, such as methyl acetate and ethyl acetate; aprotic solvents, such as dimethylformamide, dimethyl sulfoxide, and acetonitrile, with preference being given particularly to alcohols. It is possible to use a mixed solvent of water with the above organic solvent miscible with water.

The pH of the medium in which the condensation reaction is carried out may generally be in the range of 1 to 13 and a pH adjuster can be used without any particular restriction.

Although the blending ratio of the above diphenyl compound to the above quinone compound is influenced, for example, by the type of the components and the solvent to be used, the reaction temperature, and the reaction time, generally the quinone compound is preferably used in an amount of 0.01 to 10 parts by weight, and particularly preferably 0.1 to 5 parts by weight, per part by weight of the diphenyl compound. A too large or too small amount of the quinone compound to be blended causes sometimes the polymer scale deposition preventive effect of the condensation product to be lowered.

[(b) Self-condensation products]

The quinone compound that is a raw material of the self-condensation product (b) may be identical with the quinone compound used for the preparation of the above-mentioned condensation product (a). Preferable quinone compounds are also as mentioned above.

The above quinone compounds can be used singly or in combination of two or more.

The self-condensation product (b) of a quinone compound is required to have a molecular weight in the range of 400 to 50,000, and preferably 600 to 20,000. Where the molecular weight of the above self-condensation product is less than 400, the polymer scale deposition preventive effect is low, while if the molecular weight of the above self-condensation product is over 50,000, the solubility of said condensation product in water and an organic solvent is lowered to make impossible the preparation of a uniform coating liquid, the obtained coating is nonuniform, and as a result the polymer scale deposition preventive effect is lowered.

The self-condensation product (b) is produced, for example, by carrying out the condensation reaction of the above quinone compound in a suitable solvent generally at 20 to 150° C. for 2 to 200 hours.

At that time, it is preferable to carry out the reaction in the presence of an alkaline compound to facilitate the condensation reaction. In the case where the reaction is carried out in the presence of said alkaline compound, a self-condensation product having a desired molecular weight can be produced by reacting the above quinone compound generally at 20 to 150° C. for 1 to 100 hours. In that case, the amount of said alkaline compound used is preferably in the range of 0.01 to 100 parts by weight, and more preferably 0.1 to 10 parts by weight, per 100 parts by weight of the quinone compound. Said alkaline compound includes, for example, a hydroxide of an alkali metal, such as LiOH, NaOH, and KOH.

Further, in the above condensation reaction, similarly to the case of the condensation product (a), if necessary, as a condensation catalyst, an oxidizing agent as mentioned above can be used. Solvents used in this condensation reaction and preferable solvents are the same as those for the condensation product (a).

[(c) Water-soluble polymer compounds, etc.]

The coating liquid contains, in addition to the condensation product (a) or (b), at least one (c) selected from the group consisting of water-soluble polymer compounds, inorganic colloids, and silicates of alkali metals. As a result, the scale deposition preventive action of the obtainable coating is further improved. Water-soluble polymer compounds:

The water-soluble polymer compound includes, for example, an amphoteric polymer compound, such as gelatin and casein; an anionic polymer compound, such as polyacrylic acid, polystyrenesulfonic acid, carboxymethylcellulose, and alginic acid; a nitrogen-containing cationic polymer compound, such as polyvinylpyrrolidone and polyacrylamide; and a hydroxyl group-containing polymer compound, such as polyvinyl alcohol, hydroxyethylcellulose, hydroxypropylcellulose, and pectin. Preferable water-soluble polymer compounds are gelatin, casein, a polyacrylic acid, a carboxymethylcellulose, a polyvinylpyrrolidone, and pectin. These water-soluble polymer compounds may be used singly or in combination of two or more. Inorganic colloids:

The inorganic colloid is a particulate colloid which is produced by the dispersion method using water as a dispersion medium or the agglomeration method and wherein the size of the colloid particles is 1 to 500 μm.

Specifically the inorganic colloid includes, for example, a colloid of an oxide and a colloid of a hydroxide of a metal selected from the group consisting of aluminum, thorium, titanium, zirconium, antimony, tin, iron, and the like, a colloid of tungstic acid, vanadium pentoxide, gold, or silver, a silver iodide sol, and a colloid of selenium, sulfur, silica, or the like. Out of these, preferable inorganic colloids are a colloid of an oxide and a colloid of a hydroxide of a metal selected from the group consisting of aluminum, titanium, zirconium, tin, and iron; and colloidal silica. These inorganic colloids may be used singly or in combination of two or more. Alkali metal silicates:

The alkali metal silicate includes, for example, a metasilicate ($M_2SiO_3$), an orthosilicate ($M_4SiO_4$), a disilicate ($M_2Si_2O_3$), a trisilicate ($M_3Si_3O_7$), and a sesquisilicate ($M_4Si_3O_{10}$) of an alkali metal, such as lithium, sodium, and potassium, wherein M represents an alkali metal, such as lithium, potassium and sodium, and preferably sodium; and water glass.

These alkali metal silicates may be used singly or in combination of two or more.

These components (c) are used generally in an amount of 0.01 to 10 parts by weight, and more preferably 0.05 to 5 parts by weight, per part by weight of the above condensation product (a) or (b).

Preferably, the water-soluble polymer compound is used together with at least one of the inorganic colloid and the alkali metal silicate. That is, at least it is preferable to use a combination of the water-soluble polymer compound with the inorganic colloid or a combination of the water-soluble polymer with the alkali metal silicate.

In case where a combination of the water-soluble polymer compound with the inorganic colloid is used, it is preferable to use the inorganic colloid in an amount of 5 to 3,000 parts by weigh, and more preferably 50 to 1,000 parts by weight, per 100 parts by weight of the water-soluble compound. In case where a combination of the water-soluble polymer compound with the alkali metal silicate is used, the alkali metal silicate is used in an amount of 5 to 3,000 parts by weight, and more preferably 50 to 1,000 parts by weight, per 100 parts by weight of the water-soluble polymer compound.

Most preferably, a combination of three substances consisting of the water-soluble polymer compound, the inorganic colloid, and the alkali metal silicate is used. In that case, a preferable blending ratio conforms to the above blending ratio.

[Coating liquids]

The coating liquid used for the formation of the polymer scale deposition preventive coating is prepared, for example, by adding to a solution containing the condensation product obtained from the above condensation reaction the below-mentioned solvent as required, and adjusting the obtained solution to alkalinity in the case wherein the obtained solution is not alkaline. The coating liquid may also be prepared by charging the above solution containing the condensation product into cold water to precipitate the condensation product, then filtering and drying the precipitate, adding the dried precipitate to the solvent shown below, and making it alkaline.

To make the coating liquid alkaline improves the solubility of the condensation product (a) in the solvent. As a result, the coating liquid becomes a uniform solution and therefore the coating obtained therefrom becomes uniform to improve the polymer scale deposition preventive effect.

The pH of the coating liquid is preferably in the range of 7.5 to 13.5, and more preferably in the range of 8.0 to 12.5. The alkaline compound used for the adjustment of the pH includes, for example, an alkali metal compound and an ammonium compound, such as LiOH, NaOH, KOH, $Na_2CO_3$, $Na_2HPO_4$, and $NH_4OH$, and an organic amine compound, such as ethylenediamine, monoethanolamine, diethanolamine, and triethanolamine.

The solvent used for the preparation of the above polymer scale deposition preventive agent includes, for example, water; an alcohol solvent, such as methanol, ethanol, propanol, butanol, 2-butanol, 2-methyl-1-propanol, 2-methyl-2-propanol, 3-methyl-1-butanol, 2-methyl-2-butanol, and 2-pentanol; a ketone solvent, such as acetone, methyl ethyl ketone, and methyl isobutyl ketone; an ester solvent, such as methyl formate, ethyl formate, methyl acetate, ethyl acetate, and methyl acetoacetate; an ether solvent, such as 4-methyldioxolane, and ethylene glycol diethyl ether; furans; and an aprotic solvent, such as dimethylformamide, dimethyl sulfoxide, and acetonitrile. These solvents may suitably be used singly or in combination of two or more.

Out of the above solvents, water and a mixed solvent of water with an organic solvent miscible with water are preferable. Among the above-mentioned organic solvents, the organic solvent miscible with water includes, for example, an alcohol solvent, such as methanol, ethanol, and propanol; a ketone solvent, such as acetone and methyl ethyl ketone; and an ester solvent, such as methyl acetate and ethyl acetate. In case where a mixed solvent of water and an organic solvent miscible with water is used, the content of the organic solvent in the mixed solvent is preferably so selected as to avoid dangers of inflammation, explosion or the like and obviate safety problems in handling, e.g., toxicity. Specifically, the content of the organic solvent is 50% by weight or less, and more preferably 30% by weight.

The concentration of the condensation product in the above alkaline solution is not particularly restricted so long as the below-described total coating amount is secured, but the concentration is generally 0,001 to 5% by weight, and preferably 0.01 to 1% by weight.

[Formation of the coating]

The coating liquid obtained in the above-described manner is applied onto at least the inner wall surface of a polymerization vessel and is dried to form a coating. The drying operation is carried out sufficiently, for example, at a temperature ranging from room temperature to 100° C., followed by washing with water if necessary. The thus formed coating prevents effectively scale from being deposited.

Preferably the polymer scale deposition preventive coating is applied not only onto the polymerization vessel inner wall surface but also onto other parts that will contact with the monomer during the polymerization. Said other parts include, for example, stirring blades, an stirring shaft, baffles, a condenser, a header, a search coil, bolts, and nuts.

Further preferably, it is recommended that the above coating of the above polymer scale deposition preventive agent is formed on parts other than the parts that will contact with the monomer during the polymerization if it is likely that polymer scale will be deposited thereon, and such parts include, for example, the inner surface of pipelines and equipment of the system of recovering the monomer. Specific examples include a monomer distillation column, a condenser, a monomer storage tank, and valves.

The method of applying the coating liquid onto the polymerization vessel inner wall surface and the like is not particularly restricted and, for example, the brushing method, the spray coating method, and a method wherein the polymer scale deposition preventive agent is filled into the polymerization vessel and then is removed, as well as automatic coating methods described, for example, in Japanese Pre-examination Patent Publication (KOKAI) Nos. 57-61001 and 55-36288, Japanese Patent Publication (KOKOKU) Nos. 56-501116 and 56-501117, and Japanese Pre-examination Patent Publication (KOKAI) No. 59-11303 can be used.

The method of drying the wet surface after the application of the coating liquid is not restricted and, for example, the following method can be employed. That is, use is made, for example, of a method wherein after the polymer scale deposition preventive agent is applied, the coated surface is exposed to a warm wind whose temperature has been suitably elevated, or a method wherein the polymerization vessel inner wall surface and other surfaces to which the polymer scale deposition preventive agent should be applied are previously heated, for example, to 30° to 80° C. and then the polymer scale deposition preventive agent is directly applied onto the thus heated surfaces. After drying the coated surface, the coated surface is washed with water if required.

The thus obtained coating is preferably such that the total coating amount after drying is generally 0.001 to 5 $g/m^2$, and particularly 0.05 to 2 $g/m^2$.

The above coating operation may be carried out each time for the polymerization of 1 to 10 batches. Since the formed coating is high in durability and the polymer scale deposition preventive action lasts, the coating operation is not necessarily carried out each time for the polymerization of one batch and therefore the productivity is improved.

Now other polymerization conditions in the polymerization process of the present invention will be described.

Monomers

As the monomer, vinyl chloride alone and a mixture of vinyl chloride with a vinyl type monomer polymerizable with vinyl chloride (the content of the vinyl chloride in the mixture generally being 50% by weight or more) are used. This vinyl type monomer is not particularly restricted as far as the vinyl type monomer is copolymerizable with vinyl chloride. The vinyl type monomer includes, for example, an α-olefin, such as ethylene, propylene, 1-butene, 1pentene, 1-hexene, 1-heptene, 1-octene, 1-nonene, 1-decene, 1-undecene, 1-dodecene, 1-tridecene, and 1-tetradecene; an acrylic acid or its ester, such as acrylic acid, methyl acrylate and ethyl acrylate; a methacrylic acid or its ester, such as methacrylic acid and methyl methacrylate; maleic acid or its ester; a vinyl ester, such as vinyl acetate and vinyl propionate; a vinyl ether, such as lauryl vinyl ether and isobutyl vinyl ether; maleic anhydride; acrylonitrile; styrene; and vinylidene chloride. These may be used singly or in combination of two or more.

Dispersing agents

The dispersing agent may be any one which is generally used for suspension polymerization of a vinyl chloride type monomer in an aqueous medium. The dispersing agent includes, for example, a water-soluble cellulose ether, such as methyl cellulose, hydroxyethyl cellulose, hydroxypropyl cellulose, and hydroxypropyl methyl cellulose; a water-soluble or oil-soluble partially saponified polyvinyl alcohol; an acrylic acid polymer; a water-soluble polymer, such as gelatin; an oil-soluble emulsifier, such as sorbitan monolaurate, sorbitan trioleate, glycerin tristearate, and an ethylene oxide/propylene oxide block copolymer; and a water-soluble emulsifier, such as polyoxyethylene sorbitan monolaurate, polyoxyethylene glycerin oleate, and sodium laurate. These are used singly or in combination of two or more.

The amount of the dispersing agent is generally 0.02 to 5.0 parts by weight, and preferably 0.04 to 1.5 parts by weight, per 100 parts by weight of the monomer.

Aqueous mediums

As the aqueous medium, generally, deionized water is used. The amount of the aqueous medium is generally 90 to 250 parts by weight, and preferably 100 to 200 parts by weight, per 100 parts by weight of the monomer.

Other additives

To the aqueous suspension, if necessary, may be added various additives that are suitably used for suspension polymerization of vinyl chloride and the like. The additive includes, for example, a polymerization modifier, a chain transfer agent, a pH adjuster, a gelation improver, an antistatic agent, a crosslinking agent, a stabilizer, a filler, an antioxidant, a buffer, and a scale preventive agent.

Polymerization

The method of charging the aqueous medium, the monomer, the dispersing agent, etc. into the polymerization vessel, the amounts of them to be used, and the like may be similar to those which are conventional.

A typical suspension polymerization that is carried out in accordance with the present process is shown by way of example.

The dispersing agent, the aqueous medium, and other additives are charged into the polymerization vessel and mixed uniformly. Then, the inside of the polymerization vessel is evacuated so that the degree of vacuum of the gaseous phase part may be adjusted to in the range of 10 to 200 mmHg (absolute pressure), and then the monomer is charged into the polymerization vessel. The charging of the polymerization initiator may be carried out before or after the charging of the monomer. Then, after an aqueous suspension is prepared in this way, the internal temperature of the polymerization vessel is elevated to start the polymerization.

The polymerization is carried out while the polymerization temperature is kept in conformity to the polymerization initiator. During the polymerization, one or two of water, a dispersing agent, and a polymerization initiator may be added as required.

When the internal pressure of the polymerization vessel drops to 0 to 7 kgf/cm$^2$.G, or the difference between the inlet temperature and the outlet temperature of the cooling water flown into and out from the jacket reached nearly zero (namely, when the heat due to the polymerization reaction becomes not generated), it is judged that the polymerization reaction is completed, and then evacuation is carried out to recover the unreacted monomer remaining in the resulting polymer slurry. At the time of this evacuation, it may be carried out that the temperature in the polymerization vessel is elevated by supplying hot water into the jacket so that the recovery of the unreacted monomer may be improved.

The obtained polymer slurry is taken out of the polymerization vessel, dehydrated and dried, so that the intended vinyl chloride polymer can be obtained.

Generally, the polymerization is carried out at 35° to 65° C. and the polymerization time is about 1.5 to 6 hours, which will bring the polymerization to completion, although it varies depending, for example, upon the polymerization temperature, the type of the polymerization initiator, and the amount of the polymerization initiator added. Specifically, for example, in the case wherein a polymer having an average degree of polymerization of 1,700 or more is to be obtained, the polymerization is completed at the polymerization temperature of 35° to 45° C. in 3 to 6 hours. In the case wherein a polymer having an average degree of polymerization of the order of about 700 to 1,000 is to be obtained, the polymerization is completed at the polymerization temperature of 55° to 63° C. in 1.5 to 4 hours.

EXAMPLES

Now, the present invention is described in detail with reference to Examples. The present invention is not limited by these Examples at all. In the following Examples, the jacket temperature means the temperature, at the jacket inlet, of the cooling water passing through the jacket of the polymerization vessel and is suitably adjusted so that the temperature of the aqueous suspension in the polymerization vessel may be kept at a prescribed polymerization temperature.

Example 1 and Comparative Examples 1 to 3

An aqueous solution of 350 g of a partially saponified polyvinyl alcohol having a degree of saponification of 80 mol % and an average degree of polymerization of 2,000 dissolved in 890 kg of deionized water was charged into a jacketed stainless steel polymerization vessel having an internal volume of 2.1 m$^3$. After the inside of the polymerization vessel was evacuated to 50 mmHg, 700 kg of vinyl chloride monomer was charged, then the polymerization initiators shown in Table 1 were pumped into the polymerization vessel with stirring, and at the same time hot water was passed through the jacket to start the elevation of the temperature in the polymerization vessel, so that the polymerization was started.

When the temperature in the polymerization vessel reached 55° C, cooling water was passed through the jacket to allow the polymerization reaction to proceed with the temperature (polymerization temperature) in the polymerization vessel being kept at 55° C., and then when the internal pressure of the polymerization vessel dropped to 6.0 kg/cm$^2$G, the polymerization was completed, the unreacted monomer was recovered, and the obtained polymer slurry was taken out of the polymerization vessel and was dehydrated and dried to obtain the polymer.

In Comparative Example 2, two hours after the start of the polymerization, the jacket temperature reached 25° C. In order to keep the polymerization temperature at 55° C, it was required to keep the jacket temperature lower than 25° C, but the cooling capacity of the employed polymerization apparatus could not lower the jacket temperature further. As a result, the temperature of the aqueous suspension rose by 3° C. to 58° C.

The quality of each of the polymers obtained in the Examples was evaluated by the following methods. The results are shown in Table 1. State of the deposition of scale in the polymerization vessel:

After the polymer slurry was taken out of the polymerization vessel, the state of the deposition of the polymer scale in the polymerization vessel was observed, and the state was evaluated on the basis of the following four-step criterion:

A: No deposition of polymer scale was observed at the liquid phase part, the gaseous phase part, and the gaseous phase-liquid phase interface and thereabout, of the polymerization vessel inner wall surface.

B: Deposition of polymer scale was not observed at the liquid phase part and the gaseous phase part, of inner wall surface, but observed at the gaseous phase-liquid phase interface and thereabout of the same surface.

C: Deposition of polymer scale was not observed at the liquid phase part of said inner wall surface but observed at the gaseous phase part and the gaseous phase-liquid phase interface and thereabout, of the same surface.

D: Deposition of polymer scale was observed at the liquid phase part, the gaseous phase part, and the gaseous phase-liquid phase interface and thereabout of said inner wall surface.

Measurement of the bulk specific gravity:

The bulk specific gravity of the obtained polymer was measured in accordance with JIS K-6721.

Measurement of the particle size distribution:

The obtained polymer was sieved through #60, #100, and #200 sieves according to JIS Z-8801 and the passed amounts were weighed and expressed in terms of % by weight (passed amount distribution).

Measurement of the amount of fish eyes:

100 parts by weight of the obtained polymer, 50 parts by weight of DOP, 0.1 part by weight of barium stearate, 0.1 part by weight of cadmium stearate, 0.8 part by weight of cetanol, 2.0 parts by weight of a tin-containing stabilizer, 0.5 part by weight of titanium dioxide, and 0.1 part by weight of carbon black were kneaded with a 6-inch roll mill at 140° C. for 5 min, then the obtained mixture was formed into a sheet having a thickness of 0.3 mm, and the number of white transparent particles in 100 cm$^2$ of the sheet was counted.

Leaching test:

15 g of the obtained polymer was diluted with 300 ml of distilled water in a leaching bottle. The leaching bottle was placed in a sterilizer and was allowed to stand at 125° C. for 60 min. After cooling, the leaching bottle was taken out, and with respect to the supernatant the UV absorption and the potassium permanganate consumed were evaluated as shown below. A sample made up only of the above distilled water was used as a standard sample and the same measurement was carried out.
(UV absorption)

The absorbance of the supernatant obtained above was measured at a wavelength of 220 nm and 241 nm. The difference between the absorbance obtained by this measurement and the absorbance of the above standard sample obtained similarly was found and the difference was evaluated on the basis of the following criteria:

o: Less than 0.08 at 220 nm and less than 0.05 at 241 nm.

x: 0.08 or more at 220 nm and/or 0.05 or more at 241 nm.
(Potassium permanganate consumed)

KOGYO LTD.) and the evaluation was made such that the smaller the b-value was, the better the initial coloration was (the lesser the initial coloration was).

In Table 1, the abbreviations for polymerization initiators have the meanings given below:

BPD: t-butyl peroxyneodecanoate (46° C.)

CPD: α-cumyl peroxyneodecanoate (36° C.)

HDPD: 3-hydroxy-1,1-dimethylbutyl peroxyneodecanoate (36° C.)

HDPH: 3-hydroxy-1,1-dimethylbutyl peroxyneoheptanoate (41° C.)

TABLE 1

|  | Example 1 | Comparative Example 1 | Comparative Example 2 | Comparative Example 3 |
|---|---|---|---|---|
| Type and added amount of polymerization initiators (in % by weight based on monomer) | BPD/0.216% HDPD/0.050% | BPD/0.216% CPD/0.054% | BPD/0.27% | BPD/0.216% HDPH/0.054% |
| (State of polymerization) | | | | |
| Lowest jacket-temperature | 27.0° C. | 26.0° C. | 25.0° C. | 27.0° C. |
| Polymerization time | 2 hr 20 m | 2 hr 25 m | 2 hr 40 m | 2 hr 25 m |
| Scale deposition in polymerization vessel after 1 batch | A | B | C | A |
| (Quality of polymer) | | | | |
| Bulk specific gravity | 0.531 | 0.526 | 0.535 | 0.530 |
| Distribution of the size of the particles passed through sieve (in % by weight) | | | | |
| #60 | 100 | 100 | 100 | 100 |
| #100 | 45.8 | 56.2 | 62.1 | 30.2 |
| #200 | 0.5 | 0.9 | 1.0 | 0.2 |
| Fish eye | 2 | 16 | 40 | 15 |
| Leaching test | | | | |
| UV absorption | o | x | o | o |
| $KMnO_4$ consumed | x | x | o | o |
| Initial coloration | | | | |
| b-value | 11.5 | 12.4 | 13.5 | 11.6 |
| Evaluation | good | not good | not good | good |

After potassium permanganate was added to the supernatant obtained above, the resulting mixture was titrated with an aqueous sodium thiosulfate solution, and the amount of the aqueous sodium thiosulfate solution consumed was found. The difference between the amount of the aqueous sodium thiosulfate solution obtained by this titration and that of the aqueous sodium thiosulfate solution consumed by the above standard sample, to which potassium permanganate was added, by the titration was found and the difference was evaluated on the basis of the following criteria:

o: less than 1.00 cc x: 1.00 cc or more
Initial coloration:

100 parts by weight of the obtained polymer, 1 part by weight of tin laurate, 0.5 part by weight of a cadmium-containing stabilizer, and 50 parts by weight of dioctyl phthalte were blended and were kneaded with a two-roll mill at 160° C. for 5 min and the resulting mixture was formed into a sheet having a thickness of 0.8 mm. Then the sheet cut into pieces, the pieces were layered and then were placed in a frame having an internal volume of 4 cm ×4 cm ×1.5 cm, and the pieces in the frame were hot-pressed at 160° C. under 65 to 70 kgf/cm² for 10 min to make a test specimen. The b-value of the test specimen was measured by using a Color Meter (manufactured by NIHONDENSHOKU Example 2

The same polymerization procedure until obtaining a dried polymer as done in Example 1 was repeated 5 times and after the polymer slurry obtained in the fifth polymerization procedure was taken out of the polymerization vessel, the state of the polymer scale deposition in the polymerization vessel was observed. The result showed that there was no polymer scale on the polymerization vessel inner wall surface and therefore the metal specular surface of the polymerization inner wall surface was glossy.

Comparative Example 4

The same polymerization procedure until obtaining a dried polymer as done in Comparative Example 3 was repeated 5 times and after the polymer slurry obtained in the fifth polymerization procedure was taken out of the polymerization vessel, the state of the polymer scale deposition in the polymerization vessel was observed. The result showed that there was polymer scale deposition on the polymerization vessel inner wall surface and therefore the metal specular surface of the polymerization inner wall surface was a little dull.

Examples 3 to 5 and Comparative Examples 5 to 8

An aqueous solution of 760 g of a partially saponified polyvinyl alcohol having a degree of saponification of 80 mol % and an average degree of polymerization of 2,000 dissolved in 930 kg of deionized water was charged into a jacketed stainless steel polymerization vessel having an internal volume of 2.1 m$^3$. After the inside of the polymerization vessel was evacuated to 50 mmHg, 630 kg of vinyl chloride monomer was charged, then the polymerization initiators shown in Tables 2 and 3 were pumped into the polymerization vessel with stirring, and at the same time hot water was passed through the jacket to start the elevation of the temperature in the polymerization vessel, so that the polymerization was started.

When the temperature in the polymerization vessel reached 51° C, cooling water was passed through the jacket to allow the polymerization reaction to proceed with the temperature (polymerization temperature) in the polymerization vessel being kept at 51° C., and then when the internal pressure of the polymerization vessel reached 6.0 kg/cm$^2$G, the polymerization is completed, the unreacted monomer was recovered, and the obtained polymer slurry was taken out of the polymerization vessel and was dehydrated and dried to obtain the polymer.

The quality of the obtained polymers was evaluated similarly to Example 1. The results are shown in Table 2.

In Comparative Example 5, 3 hours 30 min after the start of the polymerization, the jacket temperature reached 26° C. In order to keep the polymerization temperature at 51° C, it was required to keep the jacket temperature lower than 26° C, but the cooling capacity of the employed polymerization apparatus could not lower the jacket temperature further. As a result, the temperature of the aqueous suspension rose by 1.5° C. to 52.5° C.

In Tables 2 and 3, the abbreviations for polymerization initiators have the meanings given below:

BPD: t-butyl peroxyneodecanoate (46° C.)

TPPD: 2,4,4-trimethylpentyl peroxy-2-neodecanoate (36° C.)

CPD: α-cumyl peroxyneodecanoate (36° C.)

HDPD: 3-hydroxy-1,1-dimethylbutyl peroxyneodecanoate (36° C.)

TABLE 2

|  | Example 3 | Example 4 | Example 5 |
|---|---|---|---|
| Type and added amount of polymerization initiators (in % by weight based on monomer) | BPD/0.0675% HDPD/0.0225% | TPPD/0.0675% HDPD/0.0225% | BPD/0.06% HDPD/0.06% |
| (State of polymerization) | | | |
| Lowest jacket temperature | 33.0° C. | 35.0° C. | 28.0° C. |
| Polymerization time | 4 hr 30 m | 4 hr 20 m | 3 hr 20 m |
| Scale deposition in polymerization vessel after 1 batch | A | A | A |
| (Quality of polymer) | | | |
| Bulk specific gravity | 0.485 | 0.483 | 0.487 |
| Distribution of the size of particles passed through sieve (in % by weight) | | | |
| #60 | 100 | 100 | 100 |
| #100 | 43.2 | 59.2 | 41.3 |
| #200 | 0.5 | 0.6 | 0.4 |
| Fish eye | 3 | 4 | 5 |
| Leaching test | | | |
| UV absorption | ○ | ○ | ○ |
| KMnO$_4$ consumed | ○ | ○ | ○ |
| Initial coloration | | | |
| b-value | 11.2 | 11.4 | 11.5 |
| Evaluation | good | good | good |

TABLE 3

|  | Comparative Example 5 | Comparative Example 6 | Comparative Example 7 |
|---|---|---|---|
| Type and added amount of polymerization initiators (in % by weight based on monomer) | BPD/0.15% | BPD/0.09% CPD/0.03% | HDPD/0.12% |
| (State of polymerization) | | | |
| Lowest jacket temperature | 26.0° C. | 28.0° C. | 30.0° C. |
| Polymerization time | 4 hr 10 m | 3 hr 50 m | 4 hr 10 m |
| Scale deposition in polymerization vessel after 1 batch | C | B | C |
| (Quality of polymer) | | | |
| Bulk specific gravity | 0.482 | 0.501 | 0.500 |
| Distribution of the size of particles | | | |

TABLE 3-continued

|  | Comparative Example 5 | Comparative Example 6 | Comparative Example 7 |
|---|---|---|---|
| passed through sieve (in % by weight) | | | |
| #60 | 100 | 100 | 99.5 |
| #100 | 62.3 | 45.6 | 30.1 |
| #200 | 0.6 | 0.9 | 0.5 |
| Fish eye | 30 | 45 | 40 |
| Leaching test | | | |
| UV absorption | ○ | x | ○ |
| KMnO$_4$ consumed | ○ | x | ○ |
| Initial coloration | | | |
| b-value | 12.9 | 11.6 | 11.4 |
| Evaluation | not good | good | good |

Examples 6 to 7 and Comparative Example 8

An aqueous solution of 700 g of a partially saponified polyvinyl alcohol having a degree of saponification of 80 mol % and an average degree of polymerization of 2,000 dissolved in 1030 kg of deionized water was charged into a jacketed stainless steel polymerization vessel having an internal volume of 2.1 m$^3$. After the inside of the polymerization vessel was evacuated to 50 mmHg, 570 kg of vinyl chloride monomer was charged, then the polymerization initiators shown in Table 4 were pumped into the polymerization vessel with stirring, and at the same time hot water was passed through the jacket to start the elevation of the temperature in the polymerization vessel, so that the polymerization was started.

When the temperature in the polymerization vessel reached 39° C, cooling water was passed through the jacket to allow the polymerization reaction to proceed with the temperature (polymerization temperature) in the polymerization vessel being kept at 39° C, and then when the internal pressure of the polymerization vessel reached 4.5 kg/cm$^2$G, the polymerization is completed, the unreacted monomer was recovered, and the obtained polymer slurry was taken out of the polymerization vessel and was dehydrated and dried to obtain the polymer.

The quality of the obtained polymers was evaluated similarly to Example 1. The results are shown in Table 4.

In Table 4, the abbreviations for polymerization initiators have the meanings given below:

IBP: isobutyryl peroxide (33° C.)

BPD: t-butyl peroxyneodecanoate (46° C.)

HDPD: 3-hydroxy-1,1-dimethylbutyl peroxyneodecanoate (36° C.)

TABLE 4

|  | Example 6 | Example 7 | Comparative Example 8 |
|---|---|---|---|
| Type and added amount of polymerization initiators (in % by weight based on monomer) | IBP/0.0275 HDPD/0.1375% | BPD/0.05% HDPD/0.15% | IBP/0.0275% BPD/0.1375% |
| (State of polymerization) | | | |
| Lowest jacket temperature | 30.0° C. | 26.0° C. | 26.0° C. |
| Polymerization time | 5 hr 50 m | 6 hr 10 m | 7 hr 00 m |
| Scale deposition in polymerization vessel after 1 batch | A | A | B |
| (Quality of polymer) | | | |
| Bulk specific gravity | 0.450 | 0.442 | 0.420 |
| Distribution of the size of particles passed through sieve (in % by weight) | | | |
| #60 | 100 | 100 | 100 |
| #100 | 60.1 | 65.3 | 63.6 |
| #200 | 0.6 | 0.6 | 0.6 |
| Fish eye | 4 | 3 | 10 |
| Leaching test | | | |
| UV absorption | ○ | ○ | ○ |
| KMnO$_4$ consumed | ○ | ○ | ○ |
| Initial coloration | | | |
| b-value | 11.8 | 11.9 | 12.0 |
| Evaluation | good | good | good |

Example 8

First, a preferable polymer scale deposition preventive agent (I) of the present invention was produced in the following manner.

800 g of methanol, 100 g of dimethylformamide (DMF), and 40 g of 4,4'-diaminodiphenyl sulfone were charged into a reactor equipped with a reflux condenser and having an internal volume of 2 liters and they were stirred at room temperature, so that the 4,4'-diaminodiphenyl sulfone was dissolved in the methanol/DMF.

60 g of α-naphthoquinone was added to the thus obtained methanol/DMF solution, then the temperature was elevated, and the reaction was allowed to proceed at 65° C. for 24 hours. Then the obtained reaction mixture was cooled and was added dropwise to water. The deposited sediment was filtered and dried to obtain a condensation product (a).

This condensation product (a), gelatin (c-1), and colloidal silica (trade name: Snowtex CXS-9 manufactured by Nissan Chemical Industries, LTD.; colloid particle size: 5 to 7 mμ) (c-2) were dissolved in a solvent made up of water/methanol (in a weight ratio of 7/3) to prepare such a solution that the weight ratio of (a)/(c-1)/(c-2)=1/1/1 (weight ratio) and the total concentration of (a)+(c-1)+(c-2) was 0.5%, and then the pH of the solution was adjusted to 11.0 with NaOH to obtain a polymer scale deposition preventive agent (I).

The thus prepared polymer scale deposition preventive agent (I) was applied to the inner wall of a stainless steel polymerization vessel having an internal volume of 2.1 m$^3$, the stirring shaft, the stirring blades, and other parts with which a monomer would be contact during the polymerization and was heated at 40° C. for 15 min to be dried to form a coating and then the inside of the polymerization vessel was washed with water.

Then similarly to Example 1, an aqueous solution of 350 g of a partially saponified polyvinyl alcohol in 890 kg of deionized water was charged into the polymerization vessel. After the inside of the polymerization vessel was evacuated to 50 mmHg, 700 kg of vinyl chloride monomer was charged, then the polymerization initiators whose type and amount are shown in Table 5 were pumped into the polymerization vessel with stirring, and at the same time the temperature was elevated to start the polymerization.

The polymerization reaction was allowed to proceed with the polymerization temperature being kept at 55° C., and when the internal pressure of the polymerization vessel reached 6.0 kg/cm$^2$G, the polymerization was completed, then the unreacted monomer was recovered, the obtained polymer in a slurry state was taken out of the polymerization vessel, thereafter the state of the scale deposition in the polymerization vessel was observed and the polymer was dehydrated and dried and was subjected to the following tests. The results are shown in Table 5. State of the scale deposition in the polymerization vessel:

The evaluation was carried out on the basis of the same criterion as that in Example 1 after the polymerization was repeated 100 batches (times). Measurement of the bulk specific gravity:

The bulk specific gravity was measured in the same way as in Example 1.
Measurement of the particle size distribution:

The particle size distribution was measured in the same way as in Example 1.
Measurement of the amount of fish eyes:

The amount of fish eyes measured in the same way as in Example 1.
Leaching test:

The leaching was tested in the same way as in Example 1.
Initial coloration:

Similarly to Example 1, a test specimen was prepared and the test specimen was visually observed, which was evaluated on the basis of the following criterion:

⊙: Approximately the same as that of Comparative Example 12 o: More yellowish than that of Comparative Example 12.

Example 9

10 g of C.I. Direct Blue 1 and 2 g of C.I. Basic Blue were dissolved in 2,000 ml of ion-exchanged water and then 17 g of phytic acid was added thereto to prepare an aqueous solution, which was named a polymer scale deposition preventive agent (II).

The polymer scale deposition preventive agent (II) was applied to the inside of a polymerization vessel similarly to Example 8, and then was heated at 50° C. for 10 min to be dried to form a coating, and the inside of the polymerization vessel was washed with water.

Then, the polymerization of vinyl chloride monomer was carried out similarly to Example 8, except that the polymerization initiators shown in Table 5 were used, thereby obtaining a polymer, and the polymer was subjected to the same tests as those in Example 8. The results are shown in Table 5.

Comparative Example 9

The polymerization of Example 8 was repeated, except that the polymerization initiators shown in Table 5 were used, thereby obtaining a polymer, and the polymer was tested. The results are shown in Table 5.

Comparative Example 10

The polymerization of Example 8 was repeated, except that the polymerization initiators shown in Table 5 were used, thereby obtaining a polymer, and the polymer was tested. The results are shown in Table 5. Two hours after the start of the polymerization, the jacket temperature reached 25° C. In order to keep the polymerization temperature at 55° C., it was required to keep the jacket temperature lower than 25° C., but the cooling capacity of the employed polymerization apparatus could not lower the jacket temperature further. As a result, the temperature of the aqueous suspension rose by 3° C. to 58° C.

TABLE 5

|  | Example 8 | Example 9 | Comparative Example 9 | Comparative Example 10 |
|---|---|---|---|---|
| Scale deposition preventive agent | I | II | I | I |
| Type and added amount of | BPD/0.216% | BPD/0.216% | BPD/0.216% | BPD/0.27% |

TABLE 5-continued

|  | Example 8 | Example 9 | Comparative Example 9 | Comparative Example 10 |
|---|---|---|---|---|
| polymerization initiators (in % by weight based on monomer) | HDPD/0.050% | HDPD/0.050% | CPD/0.056% | |
| (State of polymerization) | | | | |
| Lowest jacket temperature | 27° C. | 27° C. | 26° C. | 25° C. |
| Polymerization time | 2 hr 20 m | 2 hr 20 m | 2 hr 25 m | 2 hr 40 m |
| Scale deposition in polymerization vessel after repeating 100 batches | A | C | B | B |
| (Quality of polymer) | | | | |
| Bulk specific gravity | 0.530 | 0.532 | 0.527 | 0.531 |
| Particle size distribution (in % by weight) | | | | |
| #60 | 100 | 100 | 100 | 100 |
| #100 | 45.8 | 46.7 | 55.4 | 57.4 |
| #200 | 0.6 | 0.7 | 0.9 | 0.8 |
| Fish eye | 1 | 2 | 21 | 45 |
| Leaching test | | | | |
| UV absorption | ○ | ○ | x | ○ |
| KMnO$_4$ consumed | ○ | ○ | x | ○ |
| Initial coloration | ⊙ | ⊙ | ○ | ○ |

In Table 5, the abbreviations for polymerization initiators have the meanings given below:

BPD: t-butyl peroxyneodecanoate (46° C.)

CPD: α-cumyl peroxyneodecanoate (36° C.)

HDPD: 3-hydroxy-1,1-dimethylbutyl peroxyneodecanoate (36° C.)

Examples 10 to 12 and Comparative Examples 11 to 13

The above polymer scale deposition preventive agent (I) was applied to the inner wall of a stainless steel polymerization vessel having an internal volume of 2.1 m$^3$, the stirring shaft, the stirring blades, and other parts with which a monomer would contact during the polymerization and was heated at 40° C. for 15 min to be dried to form a coating and then the inside of the polymerization vessel was washed with water. Then, an aqueous solution of 760 g of a partially saponified polyvinyl alcohol in 930 kg of deionized water was charged into the polymerization vessel. After the inside of the polymerization vessel was evacuated to 50 mmHg, 630 kg of vinyl chloride monomer was charged, then the polymerization initiators whose type and amount are shown in Tables 6 and 7 were pumped into the polymerization vessel with stirring, and at the same time the temperature was elevated to start the polymerization.

The polymerization reaction was allowed to proceed with the polymerization temperature being kept at 51° C., and when the internal pressure of the polymerization vessel reached 6.0 kg/cm$^2$G, the polymerization was completed, then the unreacted monomer was recovered, the obtained polymer in a slurry state was taken out of the polymerization vessel, and the polymer was dehydrated and dried and was tested in the same way as in Example 8. The results are shown in Tables 6 and 7.

In Comparative Example 11, 3 hours and 30 min after the start of the polymerization, the jacket temperature reached 26° C. and since the cooling capacity of the polymerization apparatus could not lower the jacket temperature further, the temperature of the aqueous suspension rose by 1.5° C.

TABLE 6

|  | Example 10 | Example 11 | Example 12 |
|---|---|---|---|
| Scale deposition preventive agent | I | I | I |
| Type and added amount of polymerization initiators (in % by weight based on monomer) | BPD/0.0675% HDPD/0.0225% | BPD/0.0675% HDPD/0.0225% | PD/0.06% HDPD/0.06% |
| (State of polymerization) | | | |
| Lowest jacket temperature | 33° C. | 35° C. | 28° C. |
| Polymerization time | 4 hr 30 m | 4 hr 20 m | 3 hr 20 m |
| Scale deposition in polymerization vessel after repeating 100 batches | A | A | A |
| (Quality of polymer) | | | |
| Bulk specific gravity | 0.488 | 0.485 | 0.484 |
| Particle size distribution (in % by weight) | | | |
| #60 | 100 | 100 | 100 |
| #100 | 44.8 | 55.6 | 42.5 |
| #200 | 0.7 | 0.8 | 0.5 |
| Fish eye | 2 | 4 | 3 |

TABLE 6-continued

|  | Example 10 | Example 11 | Example 12 |
|---|---|---|---|
| Leaching test |  |  |  |
| UV absorption | ○ | ○ | ○ |
| KMnO₄ consumed | ○ | ○ | ○ |
| Initial coloration | ⊚ | ⊚ | ⊚ |

TABLE 7

|  | Comparative Example 11 | Comparative Example 12 | Comparative Example 13 |
|---|---|---|---|
| Scale deposition preventive agent | I | I | I |
| Type and added amount of polymerization initiators (in % by weight based on monomer) | BPD/0.15% | BPD/0.09% CPD/0.03% | HDPD/0.12% |
| (State of polymerization) |  |  |  |
| Lowest jacket temperature | 26° C. | 28° C. | 30° C. |
| Polymerization time | 4 hr 10 m | 3 hr 50 m | 4 hr 10 m |
| Scale deposition in polymerization vessel after repeating 100 batches | B | C | B |
| (Quality of polymer) |  |  |  |
| Bulk specific gravity | 0.482 | 0.500 | 0.501 |
| Particle size distribution (in % by weight) |  |  |  |
| #60 | 100 | 100 | 100 |
| #100 | 58.4 | 46.2 | 33.2 |
| #200 | 0.7 | 0.9 | 0.7 |
| Fish eye | 40 | 34 | 42 |
| Leaching test |  |  |  |
| UV absorption | ○ | x | ○ |
| KMnO₄ consumed | ○ | x | ○ |
| Initial coloration | ○ | ⊚ | ⊚ |

In Tables 6 and 7, the abbreviations for polymerization initiators have the meanings given below:

BPD: t-butyl peroxyneodecanoate (46° C.)

CPD: α-cumyl peroxyneodecanoate (36° C.)

HDPD: 3-hydroxy-1,1-dimethylbutyl peroxyneodecanoate (36° C.)

Examples 15 to 17

The polymerization of Example 10 was repeated, except that, in place of the scale deposition preventive agent (I), the above scale deposition preventive agent (II) was used and the initiators shown in Table 4 were used. The polymer was subjected to the same tests as in Example 8 and the results of the tests are shown in Table 8.

TABLE 8

|  | Example 15 | Example 16 | Example 17 |
|---|---|---|---|
| Scale deposition preventive agent | II | II | II |
| Type and added amount of polymerization initiators (in % by weight based on monomer) | BPD/0.0675% HDPD/0.0225% | TPPD/0.0675% HDPD/0.0225% | BPD/0.06% HDPD/0.06% |
| (State of polymerization) |  |  |  |
| Lowest jacket temperature | 33° C. | 35° C. | 28° C. |
| Polymerization time | 4 hr 30 m | 4 hr 20 m | 3 hr 20 m |
| Scale deposition in polymerization vessel after repeating 100 batches | D | D | D |
| (Quality of polymer) |  |  |  |
| Bulk specific gravity | 0.489 | 0.487 | 0.486 |
| Particle size distribution (in % by weight) |  |  |  |
| #60 | 100 | 100 | 100 |
| #100 | 46.2 | 53.3 | 44.2 |

TABLE 8-continued

|  | Example 15 | Example 16 | Example 17 |
|---|---|---|---|
| #200 | 0.7 | 0.8 | 0.6 |
| Fish eye | 6 | 5 | 7 |
| Leaching test |  |  |  |
| UV absorption | ○ | ○ | ○ |
| KMnO$_4$ consumed | ○ | ○ | ○ |
| Initial coloration | ⊙ | ⊙ | ⊙ |

In Table 8, the abbreviations for polymerization initiators have the meanings given below:

BPD: t-butyl peroxyneodecanoate (46° C.)

TPPD: 2,4,4-trimethylpentyl peroxy-2-neodecanoate (36° C.)

HDPD: 3-hydroxy-1,1-dimethylbutyl peroxyneodecanoate (36° C.)

reached 4.5 kg/cm$^2$G, the polymerization was completed, then the unreacted monomer was recovered, the obtained polymer in a slurry state was taken out of the polymerization vessel, and the polymer was dehydrated and dried and was tested in the same way as in Example 8. The results are shown in Table 9.

TABLE 9

|  | Example 18 | Example 19 | Comparative Example 14 |
|---|---|---|---|
| Scale deposition Preventive agent | I | I | I |
| Type and added amount of polymerization initiators (in % by weight based on monomer) | IBP/0.0275% HDPD/0.1375% | BPD/0.05% HDPD/0.15% | IBP/0.0275% BPD/0.1375% |
| (State of polymerization) |  |  |  |
| Lowest jacket temperature | 30° C. | 26° C. | 26° C. |
| Polymerization time | 5 hr 50 m | 6 hr 10 m | 7 hr 0 m |
| Scale deposition in polymerization vessel after repeating 100 batches | A | A | C |
| (Quality of polymer) |  |  |  |
| Bulk specific gravity | 0.452 | 0.448 | 0.422 |
| Particle size distribution (in % by weight) |  |  |  |
| #60 | 100 | 100 | 100 |
| #100 | 62.5 | 66.4 | 62.8 |
| #200 | 0.8 | 0.5 | 0.4 |
| Fish eye | 5 | 3 | 10 |
| Leaching test |  |  |  |
| UV absorption | ○ | ○ | ○ |
| KMnO$_4$ consumed | ○ | ○ | ○ |
| Initial coloration | ⊙ | ⊙ | ○ |

Examples 18 to 19 and Comparative Examples 14

The above polymer scale deposition preventive agent (I) was applied to the inner wall of a stainless steel polymerization vessel having an internal volume of 2.1 m$^3$, the stirring shaft, the stirring blades, and other parts with which a monomer would contact during the polymerization and was heated at 40° C. for 15 min to be dried to form a coating and then the inside of the polymerization vessel was washed with water. Then, an aqueous solution of 700 g of a partially saponified polyvinyl alcohol in 1030 kg of deionized water was charged into the polymerization vessel. After the inside of the polymerization vessel was evacuated to 50 mmHg, 570 kg of vinyl chloride monomer was charged, then the polymerization initiators whose type and amount are shown in Table 9 were pumped into the polymerization vessel with stirring, and at the same time the temperature was elevated to start the polymerization.

The polymerization reaction was allowed to proceed with the polymerization temperature being kept at 39° C., and when the internal pressure of the polymerization vessel In Tables 9, the abbreviations for polymerization initiators have the meanings given below:

IBP: isobutyryl peroxide (33° C.)

BPD: t-butyl peroxyneodecanoate (46° C.)

HDPD: 3-hydroxy-1,1-dimethylbutyl peroxyneodecanoate (36° C.)

Examples 20 to 21

The polymerization of Examples 18 and 19 was repeated, except that, in place of the scale deposition preventive agent (I), the above scale deposition preventive agent (II) was used and the initiators shown in Table 10 were used. The polymer was subjected to the same tests as in Example 8 and the results of the tests are shown in Table 10.

TABLE 10

|  | Example 20 | Example 21 |
| --- | --- | --- |
| Scale deposition preventive agent | II | II |
| Type and added amount of polymerization initiators (in % by weight based on monomer) | IBP/0.0275% HDPD/0.1375% | BPD/0.05% HDPD/0.15% |
| (State of polymerization) | | |
| Lowest jacket temperature | 30° C. | 26° C. |
| Polymerization time | 5 hr 50 m | 6 hr 10 m |
| Scale deposition in polymerization vessel after repeating 100 batches | C | D |
| (Quality of polymer) | | |
| Bulk specific gravity | 0.450 | 0.451 |
| Particle size distribution (in % by weight) | | |
| #60 | 100 | 100 |
| #100 | 63.8 | 67.8 |
| #200 | 0.5 | 0.3 |
| Fish eye | 7 | 6 |
| Leaching test | | |
| UV absorption | ○ | ○ |
| $KMnO_4$ consumed | ○ | ○ |
| Initial coloration | ⊚ | ⊚ |

Example 22

First, a preferable polymer scale deposition preventive agent (III) of the present invention was produced in the following manner.

A mixed solvent made up of 450 g of methanol and 450 g of water was placed in a reactor equipped with a reflux condenser and having an internal volume of 2 liters and then 100 g of α-naphthoquinone as a quinone compound and 10 g of sodium hydroxide were added. Then, the internal temperature of the reactor was elevated to 65° C. and after the mixture in the reactor was allowed to react at 65° C. for 10 hours, it was cooled to room temperature. Thus, a solution of a self-condensation product (b) was obtained.

The molecular weight of the thus obtained condensation product (b) was measured by the following method and was found to be 3,000.

Measurement of the molecular weight

The molecular weight was measured by gel permeation chromatography (GPC). The molecular weight indicates the number-average molecular weight in terms of polystyrene. The measurement conditions were as follows:

Column:
  Guard column
    Trade name: slim-pack GPC-800DP (manufactured by Shimazu Corporation)
  Analytical column
    Trade name: slim-pack GPC-803D, 802D (manufactured by Shimazu Corporation)
Mobile phase: 10 mM; LiBr/DMF
Flow rate: 1.0 ml/min
Detector: RI
Temperature: 60° C.

The condensation product (b), gelatin (c-1), and colloidal silica (trade name: Snowtex CXS-9 manufactured by Nissan Chemical Industries, LTD.; colloid particle size: 5 to 7 mμ) (c-2) were dissolved in a solvent made up of water/methanol (in a weight ratio of 7/3) to prepare such a solution that the weight ratio of (b)/(c-1)/(c-2)=1/1/1 (weight ratio) and the total concentration of (b)+(c-1)+(c-2) was 0.5%, and then the pH of the solution was adjusted to 11.0 with NaOH to obtain a polymer scale deposition preventive agent (III).

The thus prepared above polymer scale deposition preventive agent (III) was applied to the inner wall of a stainless steel polymerization vessel having an internal volume of 2.1 $m^3$, the stirring shaft, the stirring blades, and other parts with which a monomer would contact during the polymerization and was heated at 40° C. for 15 min to be dried to form a coating and then the inside of the polymerization vessel was washed with water. Then, similarly to Example 1, an aqueous solution of 350 g of a partially saponified polyvinyl alcohol in 890 kg of deionized water was charged into the polymerization vessel. After the inside of the polymerization vessel was evacuated to 50 mmHg, 700 kg of vinyl chloride monomer was charged, then the polymerization initiator whose type and amount are shown in Table 11 was pumped into the polymerization vessel with stirring, and at the same time the temperature was elevated to start the polymerization.

The polymerization reaction was allowed to proceed with the polymerization temperature being kept at 55° C., then when the internal pressure of the polymerization vessel reached 6.0 kg/cm$^2$G, the polymerization was completed, the unreacted monomer was recovered, and after the obtained polymer in a slurry state was taken out of the polymerization vessel, the state of the scale deposition in the polymerization vessel was observed and the polymer was dehydrated and dried and was tested by the methods given below. The results are shown in Table 11. State of the scale deposition in the polymerization vessel:

The state of the scale deposition was evaluated in the same manner as in Example 8.

Measurement of the bulk specific gravity:

The bulk specific gravity was measured in the same way as in Example 1.

Measurement of the particle size distribution:

The particle size distribution was measured in the same way as in Example 1.

Measurement of the amount of fish eyes:

The amount of fish eyes was measured in the same way as in Example 1.

Leaching test:

The leaching was tested in the same way as in Example 1.

Initial coloration:

The initial coloration was evaluated in the same way as in Example 8, except the following criterion was used:

⊚: approximately the same as that of Comparative Example 17 o: more yellowish than that of Comparative Example 17.

apparatus could not lower the jacket temperature further. As a result, the temperature of the aqueous suspension rose by 3° C. to 58° C.

TABLE 11

|  | Example 22 | Example 23 | Comparative Example 15 | Comparative Example 16 |
|---|---|---|---|---|
| Scale deposition preventive agent | III | II | III | III |
| Type and added amount of polymerization initiators (in % by weight based on monomer) (State of polymerization) | BPD/0.216% HDPD/0.050% | PD/0.216% HDPD/0.050% | PD/0.216% CPD/0.056% | PD/0.27% |
| Lowest jacket temperature | 27° C. | 27° C. | 26° C. | 25° C. |
| Polymerization time | 2 hr 20 m | 2 hr 20 m | 2 hr 25 m | 2 hr 40 m |
| Scale deposition in polymerization vessel after 100 batches (Quality of polymer) | A | C | B | B |
| Bulk specific gravity | 0.531 | 0.532 | 0.527 | 0.531 |
| Particle size distribution (in % by weight) | | | | |
| #60 | 100 | 100 | 100 | 100 |
| #100 | 46.2 | 46.7 | 55.4 | 57.4 |
| #200 | 0.8 | 0.7 | 0.9 | 0.8 |
| Fish eye | 0 | 2 | 21 | 45 |
| Leaching test | | | | |
| UV absorption | o | o | x | o |
| $KMnO_4$ consumed | o | o | x | o |
| Initial coloration | ⊚ | ⊚ | o | o |

In Table 11, the abbreviations for polymerization initiators have the meanings given below:

BPD: t-butyl peroxyneodecanoate (46° C.)

CPD: α-cumyl peroxyneodecanoate (36° C.)

HDPD: 3-hydroxy-1,1-dimethylbutyl peroxyneodecanoate (36° C.)

Example 23

The polymer scale deposition preventive agent (II) used in Example 9 was applied to the inside of a polymerization vessel similarly to Example 22, and then was heated at 50° C. for 10 min to be dried to form a coating, and the inside of the polymerization vessel was washed with water.

Then, the polymerization of vinyl chloride monomer was carried out similarly to Example 22, except that the polymerization initiators shown in Table 11 were used, thereby obtaining a polymer.

Comparative Example 15

The polymerization in Example 22 was repeated, except that the polymerization initiators shown in Table 11 were used, thereby obtaining a polymer.

Comparative Example 16

The polymerization in Example 22 was repeated, except that the polymerization initiators shown in Table 11 were used, thereby obtaining a polymer. Two hours after the start of the polymerization, the jacket temperature reached 25° C. In order to keep the polymerization temperature at 55° C., it was required to keep the jacket temperature lower than 25° C., but the cooling capacity of the employed polymerization Examples 24 to 26 and Comparative Examples 17 to 19

The above polymer scale deposition preventive agent (III) was applied to the inner wall of a stainless steel polymerization vessel having an internal volume of 2 1 $m^3$ the stirring shaft, the stirring blades, and other parts with which a monomer would contact during the polymerization and was heated at 40° C. for 15 min to be dried to form a coating and then the inside of the polymerization vessel was washed with water. Then, an aqueous solution of 760 g of a partially saponified polyvinyl alcohol dissolved in 930 kg of deionized water was charged into the polymerization vessel. After the inside of the polymerization vessel was evacuated to 50 mmHg, 630 kg of vinyl chloride monomer was charged, then the polymerization initiators whose type and amount are shown in Tables 12 and 13 were pumped into the polymerization vessel with stirring, and at the same time the temperature was elevated to start the polymerization.

The polymerization reaction was allowed to proceed with the polymerization temperature kept at 51° C., then when the internal pressure of the polymerization vessel reached 6.0 kg/$cm^2$G, the polymerization was completed, the unreacted monomer was recovered, and after the obtained polymer in a slurry state was taken out of the polymerization vessel, the polymer was dehydrated, dried and tested. The results are shown in Tables 12 and 13.

In Comparative Example 17, 3 hours 30 min after the start of the polymerization, the jacket temperature reached 26° C., but the cooling capacity of the employed polymerization apparatus could not bring the jacket temperature lower than that, and as a result, the temperature of the aqueous suspension rose by 1.5° C.

TABLE 12

|  | Example 24 | Example 25 | Example 26 |
|---|---|---|---|
| Scale deposition Preventive agent | III | III | III |
| Type and added amount of polymerization initiators (in % by weight based on monomer) (State of polymerization) | BPD/0.0675% HDPD/0.0225% | TPPD/0.0675% HDPD/0.0225% | BPD/0.06% HDPD/0.06% |
| Lowest jacket temperature | 33° C. | 35° C. | 28° C. |
| Polymerization time | 4 hr 30 m | 4 hr 20 m | 3 hr 20 m |
| Scale deposition in polymerization vessel after repeating 100 batches (Quality of polymer) | A | A | A |
| Bulk specific gravity | 0.486 | 0.487 | 0.486 |
| Particle size distribution (in % by weight) | | | |
| #60 | 100 | 100 | 100 |
| #100 | 45.7 | 54.3 | 44.8 |
| #200 | 0.8 | 0.9 | 0.7 |
| Fish eye | 1 | 3 | 2 |
| Leaching test | | | |
| UV absorption | ○ | ○ | ○ |
| $KMnO_4$ consumed | ○ | ○ | ○ |
| Initial coloration | ⊚ | ⊚ | ⊚ |

TABLE 13

|  | Comparative Example 17 | Comparative Example 18 | Comparative Example 19 |
|---|---|---|---|
| Scale deposition preventive agent | III | III | III |
| Type and added amount of polymerization initiators (in % by weight based on monomer) (State of polymerization) | BPD/0.15% | BPD/0.09% CPD/0.03% | HDPD/0.12% |
| Lowest jacket temperature | 26° C. | 28° C. | 30° C. |
| Polymerization time | 4 hr 10 m | 3 hr 50 m | 4 hr 10 m |
| scale deposition in polymerization vessel after repeating 100 batches (Quality of polymer) | C | C | C |
| Bulk specific gravity | 0.482 | 0.500 | 0.501 |
| Particle size distribution (in % by weight) | | | |
| #60 | 100 | 100 | 100 |
| #100 | 58.4 | 46.2 | 33.2 |
| #200 | 0.7 | 0.9 | 0.7 |
| Fish eye | 40 | 34 | 42 |
| Leaching test | | | |
| UV absorption | ○ | x | ○ |
| $KMnO_4$ consumed | ○ | x | ○ |
| Initial coloration | ○ | ⊚ | ⊚ |

In Tables 12 and 13, the abbreviations for polymerization initiators have the meanings given below:

BPD: t-butyl peroxyneodecanoate (46° C.)
TPPD: 2,4,4-trimethylpentyl peroxy-2-neodecanoate (36° C.)
CPD: α-cumyl peroxyneodecanoate (36° C.)
HDPD: 3-hydroxy-1,1-dimethylbutyl peroxyneodecanoate (36° C.)

Examples 27 to 29

The polymerization in Example 24 was repeated, except that in place of the scale deposition preventive agent (III), the above scale deposition preventive agent (II) was used and the initiators shown in Table 14 were used. The polymer was subjected to the same tests as in Example 22 and the results of the tests are shown in Table 14.

TABLE 14

|  | Example 27 | Example 28 | Example 29 |
|---|---|---|---|
| Scale deposition preventive agent | II | II | II |
| Type and added amount of | BPD/0.0675% | BPD/0.0675% | BPD/0.06% |

TABLE 14-continued

|  | Example 27 | Example 28 | Example 29 |
|---|---|---|---|
| polymerization initiators (in % by weight based on monomer) (State of polymerization) | HDPD/0.0225% | HDPD/0.0225% | HDPD/0.06% |
| Lowest jacket temperature | 33° C. | 35° C. | 28° C. |
| Polymerization time | 4 hr 30 m | 4 hr 20 m | 3 hr 20 m |
| Scale deposition in polymerization vessel after repeating 100 batches (Quality of polymer) | C | C | C |
| Bulk specific gravity | 0.489 | 0.487 | 0.486 |
| Particle size distribution (in % by weight) | | | |
| #60 | 100 | 100 | 100 |
| #100 | 46.2 | 53.3 | 44.2 |
| #200 | 0.7 | 0.8 | 0.6 |
| Fish eye | 6 | 5 | 7 |
| Leaching test | | | |
| UV absorption | ○ | ○ | ○ |
| $KMnO_4$ consumed | ○ | ○ | ○ |
| Initial coloration | ⊚ | ⊚ | ⊚ |

Examples 30 to 31 and Comparative Examples 20

The polymer scale deposition preventive agent (III) thus prepared above was applied to the inner wall of a stainless steel polymerization vessel having an internal volume of 2.1 m$^3$, the stirring shaft, the stirring blades, and other parts with which a monomer would contact during the polymerization and was heated at 40° C. for 15 min to be dried to form a coating and then the inside of the polymerization vessel was washed with water. Then, an aqueous solution of 700 g of a partially saponified polyvinyl alcohol dissolved in 1030 kg of deionized water was charged into the polymerization vessel. After the inside of the polymerization vessel was evacuated to 50 mmHg, 570 kg of vinyl chloride monomer was charged, then the polymerization initiators whose type and amount are shown in Table 15 were pumped into the polymerization vessel with stirring, and at the same time the temperature was elevated to start the polymerization.

The polymerization reaction was allowed to proceed with the polymerization temperature being kept at 39° C., then when the internal pressure of the polymerization vessel reached 4.5 kg/cm$^2$G, the polymerization was completed, the unreacted monomer was recovered, and after the obtained polymer in a slurry state was taken out of the polymerization vessel, the polymer was dehydrated, dried and tested as set forth in the following. The results are shown in Table 15.

TABLE 15

|  | Example 30 | Example 31 | Comparative Example 20 |
|---|---|---|---|
| Scale deposition preventive agent | III | III | III |
| Type and added amount of polymerization initiators (in % by weight based on monomer) (State of polymerization) | IBP/0.0275% HDPD/0.1375% | BPD/0.05% HDPD/0.15% | IBP/0.0275% BPD/0.1375% |
| Lowest jacket temperature | 30° C. | 26° C. | 26° C. |
| Polymerization time | 5 hr 50 m | 6 hr 10 m | 7 hr 0 m |
| Scale deposition in polymerization vessel after repeating 100 batches (Quality of polymer) | A | A | B |
| Bulk specific gravity | 0.454 | 0.449 | 0.422 |
| Particle size distribution (in % by weight) | | | |
| #60 | 100 | 100 | 100 |
| #100 | 61.8 | 65.4 | 62.8 |
| #200 | 0.9 | 0.6 | 0.4 |
| Fish eye | 3 | 2 | 10 |
| Leaching test | | | |
| UV absorption | ○ | ○ | ○ |
| $KMnO_4$ consumed | ○ | ○ | ○ |
| Initial coloration | ⊚ | ⊚ | ○ |

In Table 15, the abbreviations for polymerization initiators have the meanings given below:

IBP: isobutyryl peroxide (33° C.)

BPD: t-butyl peroxyneodecanoate (46° C.)

HDPD: 3-hydroxy-1,1-dimethylbutyl peroxyneodecanoate (36° C.)

Examples 32 to 33

The polymerization of Examples 30 and 31 was repeated, except that in place of the scale deposition preventive agent (III), the above scale deposition preventive agent (II) was used. The obtained polymer was subjected to the same tests as in Example 22. The results of the tests are shown in Table 16.

TABLE 16

|  | Example 20 | Example 21 |
|---|---|---|
| Scale deposition preventive agent | II | II |
| Type and added amount of polymerization initiators (in % by weight based on monomer) | IBP/0.0275% HDPD/0.1375% | BPD/0.05% HDPD/0.15% |
| (State of polymerization) |  |  |
| Lowest jacket temperature | 30° C. | 26° C. |
| Polymerization time | 5 hr 50 m | 6 hr 10 m |
| Scale deposition in polymerization vessel after repeating 100 batches | C | C |
| (Quality of polymer) |  |  |
| Bulk specific gravity | 0.450 | 0.451 |
| Particle size distribution (in % by weight) |  |  |
| #60 | 100 | 100 |
| #100 | 63.8 | 67.8 |
| #200 | 0.5 | 0.3 |
| Fish eye | 7 | 6 |
| Leaching test |  |  |
| UV absorption | ○ | ○ |
| KMnO₄ consumed | ○ | ○ |
| Initial coloration | ⊙ | ⊙ |

What is claimed is:

1. A process of producing a vinyl chloride polymer, which comprises suspension polymerizing vinyl chloride or a mixture of vinyl monomers containing vinyl chloride in an aqueous medium in the presence of an oil-soluble polymerization initiator in a polymerization vessel, wherein said oil-soluble polymerization initiator comprises:

(A) an organic peroxide such that a 10-hour half-life period temperature of a solution containing 0.1 mol of the organic peroxide per liter of benzene is 30° to 50° C., wherein the organic peroxide is at least one member selected from the group consisting of isobutyryl peroxide, t-hexyl peroxyneodecanoate, t-butyl peroxyneodecanoate, t-hexyl peroxyneohexanoate, 2,4,4-trimethylpentyl peroxy-2-neodecanoate and 1-cyclohexyl-1-methylethyl peroxyneodecanoate, and (B) 3-hydroxy-1,1-dimethylbutyl peroxyneodecanoate, in combination;

wherein the weight ratio of component (A) to component (B) is from 1:9 to 9:1 and the total amount of the components (A) and (B) is from 0.05 to 0.4% by weight based on the monomer;

wherein the inner wall surface of the polymerization vessel has a polymer scale deposition preventive coating formed by applying, onto said inner wall surface, an alkaline liquid containing at least one member selected from the group consisting of (a) condensation products of a diphenyl compound having at least two amino groups represented by the following formula (6):

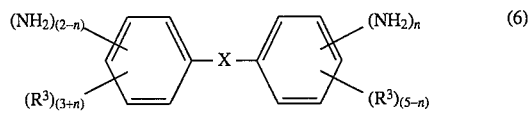

wherein $R^3$ which are the same or different, represent a group selected from the group consisting of —H, —OH, —COOH, —SO₃H, —NH₂, —Cl, —NO₂, —COCH₃, —N(CH₃)₂, and an alkyl group having 1 to 3 carbon atoms, X represents a bivalent group selected from the group consisting of an alkylene group having 1 to 5 carbon atoms, —N(CH₃)—, —C(CH₃)₂—, —CONH—, —P(=O)H—, —SO₂—, —O—, —S—, and —Si(R)₂— in which R represents an alkyl group having 1 to 10 carbon atoms, and n is an integer of from 1 to 2, with a quinone compound, and (b) self-condensation products having a molecular weight of 400 to 50,000 obtained by condensing a quinone compound; and (c) at least one member selected from the group consisting of water-soluble polymer compounds, inorganic colloids, and alkali metal silicates;

wherein said quinone compound of components (a) and (b) is a member selected from the group consisting of benzoquinone compounds represented by the following formulas (7) and (8):

wherein $R^4$, which are the same or different, represent a group selected from the group consisting of —H, —NH$_2$, —Cl, —Br, —OH, —NO$_2$, —COCH$_3$, —OCH$_3$, —N(CH$_3$)$_2$, —COOH, —SO$_3$H, and an alkyl group having 1 to 3 carbon atoms, and naphthoquinone compounds represented by the following general formulas (9) and (10):

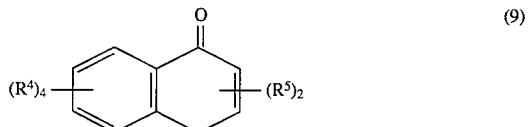

(9)

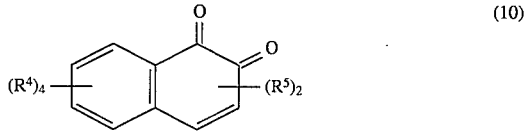

(10)

wherein R$^4$ have the same meaning as defined above, and R5, which are the same or different, represent a group selected from the group consisting of —H, —Cl, —Br, —OH, —COCH$_3$, —OCH$_3$, —CH$_3$, —COOH, and —SO$_3$H;

followed by drying the alkaline liquid.

2. The process of claim 1, wherein said quinone compound is at least one compound selected from the group consisting of o- and p-benzoquinones, α-naphthoquinone, β-naphthoquinone, and lawsone.

3. The process of claim 1, wherein the diphenyl compound constituting the component (a) is at least one compound selected from the group consisting of 4,4'-diaminodiphenyl sulfone, 4,4'-diaminobenzanilide, 4,4'-diaminodiphenyl ether, and 4,4'-diaminodiphenylmethane.

4. The process of claim 1, wherein the quinone compound constituting the component (a) is used in an amount of 0.01 to 10 parts by weight per part by weight of the diphenyl compound.

5. The process of claim 1, wherein the component (c) is a combination of a water-soluble polymer compound with at least one component selected from the group consisting of inorganic colloids and alkali metal silicates.

6. The process of claim 1, wherein the amount of the component (c) is 0.01 to 10 parts by weight per part by weight of the condensation product (a) or (b).

7. The process of claims 1, wherein the water-soluble polymer compound is at least one selected from the group consisting of gelatin, casein, polyacrylic acid, carboxymethylcellulose, polyvinylpyrrolidone, and pectin.

8. The process of claim 1, wherein the inorganic colloid is at least one selected from the group consisting of colloids of oxides and colloids of hydroxides of metals selected from the group consisting of aluminum, titanium, zirconium, tin, and iron and colloidal silica.

9. The process of claim 1, wherein the alkali metal silicate is at least one selected from the group consisting of a metasilicate (M$_2$SiO$_3$), an orthosilicate (M$_4$SiO$_4$), a disilicate (M$_2$Si$_2$O$_3$), a trisilicate (M$_3$Si$_3$O$_7$), and a sesquisilicate (M$_4$Si$_3$O$_{10}$) of an alkali metal, wherein M represents an alkali metal, and water glass.

10. The process of claim 1, wherein the coating amount of said polymer scale deposition preventive coating after dried is 0.001 to 5 g/m$^2$.

11. The process of claim 1, wherein said polymer scale deposition preventive coating is formed, in addition to the inner wall surface of the polymerization vessel, on other parts with which a monomer will contact during the polymerization.

* * * * *